Fig. 2

| Gear Ratio | (General) | Ratios if Gearsets are Identical | For $S/R=.6$ |
|---|---|---|---|
| 1ST | $1 + \frac{S_1}{R_1} + \frac{S_1}{R_1}\frac{R_2}{S_2}$ | $2 + \frac{S}{R} + \frac{R}{S}$ | 4.27 |
| 2ND | $1 + \frac{S_1}{R_1} + \frac{S_1}{R_1}\frac{R_2}{S_2}(1+\frac{R_3}{S_3})$ | $2 + \frac{S}{R}$ | 2.60 |
| 3RD | $1 + \frac{S_1}{R_1}$ | $1 + \frac{S}{R}$ | 1.60 |
| 4TH | $1$ | $1.00$ | 1.00 |
| REV. | $-\frac{R_2}{S_2}(1+\frac{R_3}{S_3})$ | $-\frac{R}{S}(1+\frac{R}{S})$ | -4.44 |

INVENTOR:
LARRY A. KEPNER
BY
ATTORNEYS

United States Patent Office 3,523,468
Patented Aug. 11, 1970

3,523,468
FOUR SPEED RATIO PLANETARY GEAR MECHANISM
Larry A. Kepner, Dearborn, Mich., assignor to Ford Motor Company, Dearborn, Mich., a corporation of Delaware
Filed Nov. 4, 1968, Ser. No. 772,963
Int. Cl. F16h 57/10
U.S. Cl. 74—759                    4 Claims

ABSTRACT OF THE DISCLOSURE

A planetary gear system capable of providing four forward driving speed ratios and a single reverse speed ratio with three simple planetary gear sets including, in addition to conventional, multiple-element, planetary gear units, an additional gear unit that cooperates with the elements of the conventional planetary gearing to produce a modified, torque ratio range.

CROSS REFERENCE TO RELATED DISCLOSURE

My invention comprises improvements in the disclosure of R. L. Leonard et al. in their Pat. No. 3,295,387.

BRIEF DESCRIPTION OF THE INVENTION

My invention comprises a planetary gear arrangement capable of providing plural torque delivery paths between an internal combustion engine and the traction wheels in an automotive vehicle driveline. It consists of three planetary gear sets, two of which are arranged in a manner similar to the gearing arrangement of U.S. Pat. No. 3,295,-387. That patent provides three forward driving speed ratios and a single reverse ratio. The lowest speed ratio is characterized by a split torque delivery path through the gearing. This feature is common also to my invention. My invention is distinguished from the Leonard et al. disclosure, however, by the provision of an additional gear set, the elements of which cooperate with the elements of the aforementioned two simple planetary gear units to produce a unitary result which includes the provision of a fourth speed ratio as well as a modified multiplication ratio throughout the torque multiplication range during operation.

I expect that the improvements of my invention can be applied to conventional planetary gearing of the type above described. In this way an additional ratio can be obtained, thereby converting a conventional gear unit in an automotive driveline to a gear unit that is the equivalent of an overdrive unit.

It is an object of my invention to provide a four speed ratio gear unit of the type above set forth wherein ratio shifts from one ratio to the other can be accomplished in a non-synchronous fashion thereby eliminating the necessity to engage or disengage a clutch in timed relationship with the engagement and release of a friction brake, and wherein the torque multiplication ratios that are available in the operating range are relatively evenly stepped from one extreme to the other.

BRIEF DESCRIPTION OF THE VIEWS OF THE DRAWINGS

FIG. 2 is a chart showing the gear ratios that are available in each of the operating conditions for the gearing arrangement of FIG. 1.

PARTICULAR DESCRIPTION OF THE INVENTION

Figure 1:
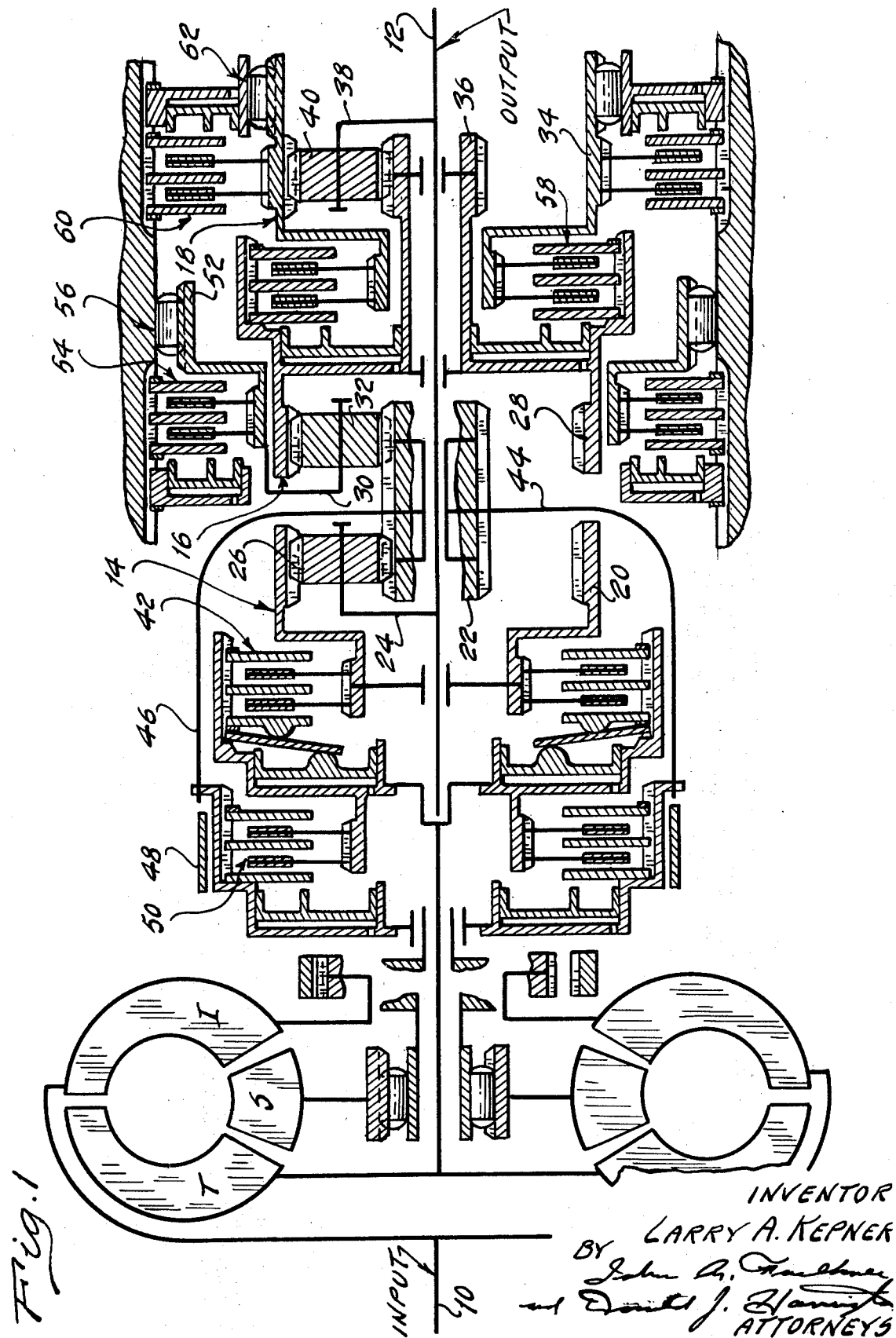
FIG. 1 shows in schematic form a longitudinal cross sectional view of a gearing arrangement embodying the improvements of my invention.

In FIG. 1, numeral 10 designates a power input shaft which may be connected to the turbine of a hydrokinetic torque converter of known construction. The impeller and the turbine of the torque converter are situated in toroidal fluid flow relationship. The impeller is connected to a crankshaft of an internal combustion engine.

Numeral 12 designates a power output shaft which is connected to the vehicle traction wheels through a driveshaft and a differential-axle assembly.

The gearing includes three simple planetary gear units 14, 16 and 18. Gear unit 14 includes a ring gear 20, a sun gear 22, a planetary carrier 24, planet pinions 26 journaled rotatably on the carrier 24. Pinions 26 mesh with the ring gear 20 and sun gear 22.

Sun gear 22 is common to the planetary gear units 14 and 16. Gear unit 14 includes a ring gear 28, a carrier 30, planet pinions 32 rotatably journaled on the carrier 30 and the previously mentioned sun gear 22. Pinions 32 drivably engage sun gear 22 and ring gear 28.

Gear unit 18 includes ring gear 34, sun gear 36, a planetary carrier 38 and planet pinions 40. The pinions 40 are journaled rotatably on carrier 38, and they mesh with ring gear 34 and sun gear 36.

By preference the ring gears 20, 28 and 34 are formed witth a common pitch diameter. Also, sun gear 22 and sun gear 36 are formed with a common pitch diameter. This being the case, the pinions 26, 32 and 40 also have the same pitch diameter. This geometric relationship between the gear units 14, 16 and 18 simplifies the manufacturing process since the parts are interchangeable and may be machined with a common machining operation.

Power output shaft 12 is connected directly to carrier 38 and carrier 24. Ring gear 20 is adapted to be connected drivably to power input shaft 10 through a selectively engageable friction clutch 42. This clutch may be applied and released by a suitable fluid pressure operated servo. It is applied during operation in the first, third and fourth forward driving speed ratios.

Sun gear 22 is drivably connected to a drive shell 44 which encircles the gear unit 14. Drive shell 44 defines at its other extremity a brake drum 46 about which is positioned a friction brake band 48. The brake band 48 can be applied and released to anchor selectively the drum 46. A suitable fluid pressure operated brake servo can be provided for this purpose.

Brake drum 46 is adapted to be drivably connected to power input shaft 10 through a selectively engageable friction clutch 50, which can be applied and released by a suitable fluid pressure operated clutch servo. It is applied during operation in the fourth speed ratio and during reverse drive, but is released during other driving conditions.

The carrier 30 is connected to a brake drum 52 which is adapted to be anchored against the relatively stationary transmission housing by a selectively engageable friction brake 54. This brake is engaged during hill braking operation in the first speed ratio and in the second speed ratio. It is engaged also during reverse drive. It is disengaged at all other times.

An overrunning brake 56 complements the action of the friction brake 54. It includes an outer race that is anchored to the transmission housing and an inner race that is carried by the drum 52. Overrunning brake elements are situated between the races to inhibit rotation of the drum 52 in one direction. It will permit freewheeling motion, however, in the opposite direction. Overrunning brake 56 provides torque reaction during normal operation in the low speed ratio and in the second speed ratio during acceleration from a standing start. It is not capable, however, of accommodating torque reaction during coasting operation. Brake 54 provides this function.

Ring gear 28 is drivably connected to sun gear 36. Ring gear 34 is adapted to be connected drivably to sun gear 36 through a selectively engageable friction clutch 58. This clutch is engaged during operation in the second, third and fourth speed ratios in the forward drive range, and it is disengaged at other times. Ring gear 34 can be braked against the stationary transmission housing during reverse drive operation and during hill-braking operation in the first speed ratio by means of a selectively engageable friction brake 60. Both brake 60 and clutch 58 can be applied and released by means of suitable fluid pressure operated servos.

An overrunning brake 62 complements the action of the brake 60. It includes an inner race connected to the ring gear 34 and an outer race connected to the stationary housing. Overrunning coupling elements are situated between the races to provide a torque reaction during forward drive operation in the lowest speed ratio. Brake 60 provides hill braking torque reaction during operation in the lowest speed ratio. It provides torque reaction also during reverse drive.

To condition the transmission mechanism for operation in the lowest speed ratio, clutch 42 is applied. Turbine torque then is delivered to the ring gear 20. Since the carrier 24 is connected to the output shaft, rotation of the carrier is resisted. This causes torque to be delivered to the sun gear 22. The sun gear torque tends to drive ring gear 28 in a forward driving direction. The torque reaction is taken by the carrier 30, which is anchored by the overrunning brake 56. The ring gear torque for ring gear 28 is multiplied by the gear unit 18.

Ring gear torque delivered to sun gear 36 of gear unit 18 is multiplied by the gear unit with the ring gear 34 acting as a reaction member. Overrunning brake 62 provides a torque reaction. A split torque delivery path thus is provided, a portion of the torque being delivered to the output shaft 12 from a carrier 38 and the balance of the torque being distributed to the output shaft 12 by the carrier 24.

An upshift to the second speed ratio is achieved by applying selectively engageable clutch 58. The gear unit 18 thus provides a driving connection between ring gear 28 and output shaft 12. Gear units 14 and 16 function in the same fashion as they did during operation in the lowest speed ratio. Overrunning brake 56 again provides torque reaction.

An upshift from the second speed ratio to the third speed ratio is achieved by engaging brake 48 thereby anchoring common sun gear 22. A single torque delivery path then is established from carrier 24 to output shaft 12. Gear units 16 and 18 perform no function at this time.

Direct drive operation is achieved by engaging clutch 50. Clutch 42 is engaged during each of the four forward driving speed ratios. Clutch 58 is engaged during operation in the second, third and fourth speed ratios. Thus a direct drive connection is established between shafts 10 and 12.

Reverse drive is obtained by engaging clutch 50 and disengaging clutches 42 and 58. Brakes 54 and 60 are applied. Turbine torque then is delivered from shaft 10 to sun gear 22. This causes ring gear 28 to be driven in a reverse direction as carrier 30 acts as a reaction member. The torque of ring gear 28 is multiplied by gear unit 18 as ring gear 34 is anchored.

By providing an arrangement of planetary gear units of this type, it is possible to achieve four forward speed ratios with evenly stepped increments. The gearing arrangement shown, for example, in U.S. Pat. No. 3,295,387 employs torque delivery paths similar to those provided by gear units 14 and 16 of this disclosure. The output from the gear unit 28 of this disclosure, however, is not distributed directly to the output shaft as in the case of the structure shown in Pat. No. 3,295,387. A split torque delivery path is established during low speed ratio in my improved transmission, and this path is defined in part by the gear unit 18. Similarly a split torque delivery path is established during second speed ratio operation with a portion of the torque being distributed through the gear unit 18 to the carrier 38, and hence to the output shaft 12. The balance of the torque is distributed to the shaft 12 through the carrier 24.

An improved reverse drive ratio is achieved with my improvement. This ratio is not available in an arrangement of the type shown in Pat. No. 3,295,387.

Because four forward driving speed ratios are available rather than three, it is possible with my improved transmission to alter the axle ratio in an automotive vehicle driveline to produce an overall torque ratio that is the equivalent of an overdrive ratio during operation in direct drive. This cannot be achieved, of course, with a gear arrangement of the type shown in Pat. No. 3,295,387 since in that case the torque ratio in the lowest speed ratio would be too low for acceleration purposes.

Having thus described a preferred form of my invention, what I claim and desire to secure by U.S. Letters Patent is:

1. A power transmission mechanism comprising three simple planetary gear units, a power input shaft, a power output shaft, each gear unit comprising a ring gear, a sun gear, a carrier and planet pinions rotatably journaled on said carrier in meshing engagement with said sun and ring gears, the sun gears for a first and a second of said gear units being connected together for rotation in unison, the ring gear of said second gear unit being connected to the sun gear of said third gear unit, the carrier for the first gear unit being connected to said output shaft, first clutch means for connecting selectively the sun gears for said first and second gear units to said input shaft, second selectively engageable clutch means for connecting the ring gear of said first gear unit to said input shaft, third selectively engageable clutch means for establishing a direct connection between the ring gear of said second gear unit and the carrier of said third gear unit, the carrier of said third gear unit being connected to said output shaft, brake means for anchoring the carrier of said second gear unit to provide torque reaction during operation in the first speed ratio and in the second speed ratio, said first clutch means being engaged during operation in the fourth speed ratio and reverse drive operation, said second clutch means being engaged during operation in each of four forward driving speed ratios, said third clutch means being engaged during operation in the second, third and fourth speed ratios, selectively engageable brake means for anchoring the sun gears of said first and second gear units during operation in third speed ratio, and third brake means for anchoring the ring gear of said third gear unit during operation in the first speed ratio.

2. The combination as set forth in claim 1 wherein the ring gears of each of said gear units and the sun gears of each of said gear units, respectively, are of the same pitch diameter.

3. The combination as set forth in claim 1 wherein the brake means for anchoring the carrier of said second gear unit comprises an overrunning coupling adapted to accommodate torque reaction in one direction but permitting freewheeling motion in the opposite direction, said third brake means comprising an overrunning coupling capable of accommodating torque reaction in one direction but permitting freewheeling motion in the opposite direction, and separate selectively engageable friction brake means acting in parallel relationship with respect to each of said overrunning brake means for accommodating torque reaction during reverse drive operation and during coasting with the torque being delivered from the output shaft to the input shaft.

4. The combination as set forth in claim 2 wherein the brake means for anchoring the carrier of said second gear unit comprises an overrunning coupling adapted to accommodate torque reaction in one direction but permitting freewheeling motion in the opposite direction, said third brake means comprising an overrunning coupling capable of accommodating torque reaction in one direction but permitting freewheeling motion in the opposite direction, and separate selectively engageable friction brake means acting in parallel relationship with respect to each of said overrunning brake means for accommodating torque reaction during reverse drive operation and during coasting with the torque being delivered from the output shaft to the input shaft.

References Cited
UNITED STATES PATENTS

| | | | |
|---|---|---|---|
| 2,518,824 | 8/1950 | Simpson | 74—763 |
| 3,035,457 | 5/1962 | Cartwright | 74—763 X |
| 3,053,115 | 9/1962 | Cartwright et al. | 74—763 X |

ARTHUR T. McKEON, Primary Examiner

U.S. Cl. X.R.

74—763